J. S. GILBERTIE.
LAWN MOWER.
APPLICATION FILED OCT. 25, 1917.

1,261,020.

Patented Apr. 2, 1918.
2 SHEETS—SHEET 2.

INVENTOR
John S. Gilbertie
BY
A. M. Wooster
ATTORNEY

UNITED STATES PATENT OFFICE.

JOHN S. GILBERTIE, OF WESTPORT, CONNECTICUT.

LAWN-MOWER.

1,261,020.

Specification of Letters Patent.   Patented Apr. 2, 1918.

Application filed October 25, 1917. Serial No. 198,388.

*To all whom it may concern:*

Be it known that I, JOHN S. GILBERTIE, a subject of the King of Italy, residing at Westport, county of Fairfield, State of Connecticut, have invented an Improvement in Lawn-Mowers, of which the following is a specification.

This invention has for its object to provide a lawn mower which shall be simple in construction, relatively inexpensive to build, easy to operate and which will give a wide cut, will cut the grass in front of the wheels and which shall be so constructed and arranged that the mower may be run close to a wall and either of the rear cutters may be run under a bush without injuring it, thus enabling me to make a clean cut as far forward and as far on either side as may be required, which practically does away with a large amount of trimming that has heretofore been necessary to complete the work of the mower.

Figure 1:
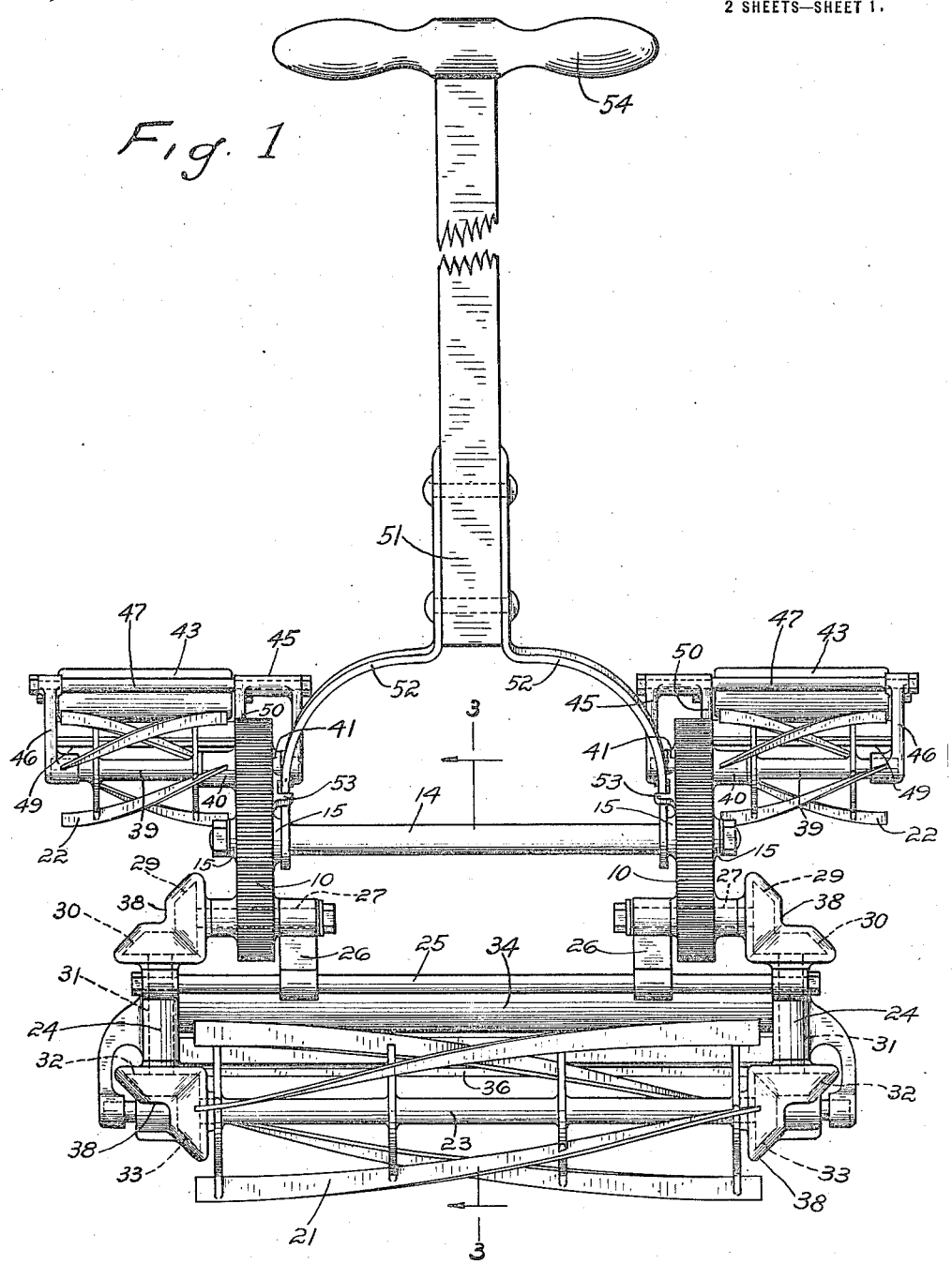
Figure 2:
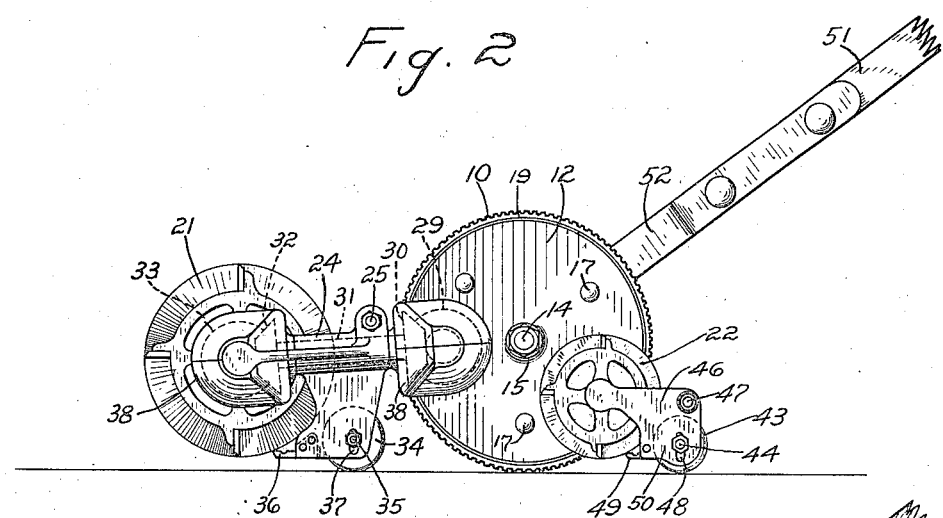
Figure 3:
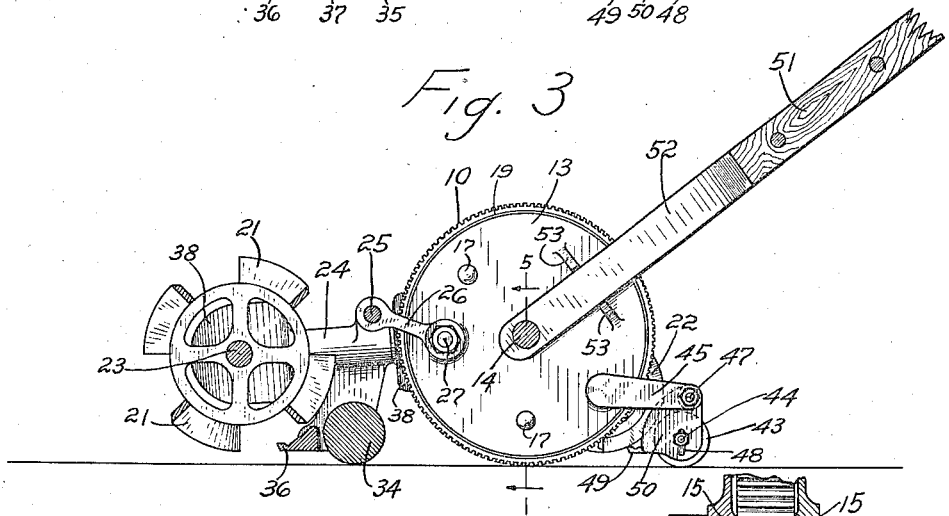
Figure 4:
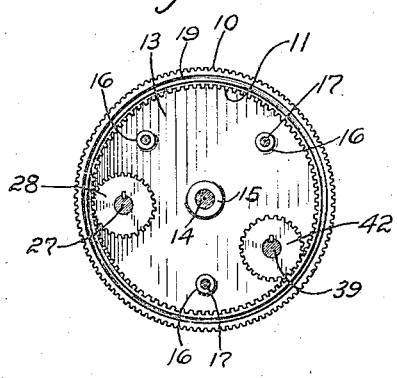
Figure 5:
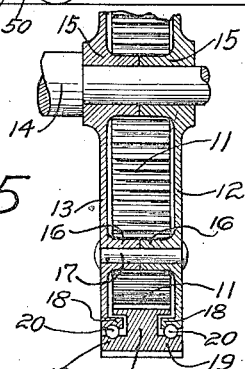

In the accompanying drawings forming a portion of this specification,

Figure 1 is a plan view of my novel mower, as in use,

Fig. 2 a side elevation thereof,

Fig. 3 a section on the line 3—3 in Fig. 1, looking in the direction of the arrows, Fig. 4 a side elevation of one of the driving wheels with the outer plate and parts carried thereby removed, and Fig. 5 is a detail sectional view on an enlarged scale on the line 5—5 in Fig. 3, looking in the direction of the arrows.

I have shown the novel features of my invention as applied to a hand lawn mower although of course the invention is equally adapted to a power driven mower.

10 denotes the driving wheels which are H-shaped in cross section, see Fig. 5, and are provided with internal gear teeth 11. 12 denotes outer and 13 inner side plates which are rigidly secured to a shaft 14 and comprise a portion of the frame work of the machine. The central hubs 15 of the side plates contact with each other and said plates are provided with other internal hubs 16 which contact with each other and are secured together by rivets 17. The side plates are provided at their peripheries with inwardly turned flanges 18 and the driving wheels are provided with flanges 19 lying outside thereof. Flanges 18 and 19 are provided with corresponding grooves to receive balls 20 thus providing ball bearings on which the driving wheels rotate. 21 denotes the front cutter and 22 the rear cutters. These are simply rotary cutters of the ordinary type used in mowing machines. The front cutter is carried by a shaft 23, the ends of which are journaled in brackets 24 which are braced and secured together by a tie rod 25. 26 denotes links which are rigidly secured to the tie rod and are adapted to swing on shafts 27 which carry pinions 28 meshing with the internal gear teeth 11 on the respective driving wheels. Shafts 27 are journaled in bearings in the side plates and also carry bevel pinions 29 which mesh with bevel pinions 30 on shafts 31. These shafts also carry bevel pinions 32 which mesh with bevel pinions 33 on the front cutter shaft and drive the cutter. 34 denotes a ground roller fixed to a shaft 35, the ends of which are journaled in brackets 24. These brackets also carry the bed knife 36 which coöperates with the front cutter. The ends of shaft 35 are adjustable in slots 37 in the brackets, the effect of the adjustment being to regulate the height of the front cutter and its bed knife from the ground. The bevel gears appear in dotted lines only, as they are inclosed in and protected by housings 38.

It will be noted as an important feature of the present invention that the construction is such as to enable the front cutter to be placed directly in front of the driving wheels and to be made appreciably wider than the track of the driving wheels, so that in use the grass in front of the driving wheels is cut before they pass over it. It will be noted furthermore, that the links, tie rod and brackets in fact comprise a frame which carries the front cutter, its bed knife and the ground roller. This provides the necessary flexibility for the front portion of the machine, and a convenient adjustment of the ground roller which determines the height of the cutter from the ground.

The rear cutters are carried by shafts 39, which are journaled in hubs 40 and 41 extending outward from side plates 12 and 13, respectively. These shafts carry pinions 42, which mesh with the internal gear teeth 11 on the respective driving wheels. 43 denotes ground rollers fixed to shafts 44, the ends of which are journaled in wings 50 depending from brackets 45 and 46 which are adapted to oscillate on shafts 39. The brackets upon each side of the machine are connected together by a tie rod 47, each pair of brackets and the connecting tie rod comprising a frame for the corresponding rear cutter, which is adapted to swing on the corresponding shaft 39. The ground roller shafts are adjustable in slots 48 in the wings which also carry the bed knives 49 which coöperate with the rear cutters.

51 denotes the tongue which is provided at its inner end with curved arms 52 through which shaft 14 passes. Each of the arms lies in a notch in a boss 53 on the corresponding inner side plate, by which the arms and tongue are rigidly held in operative position, the tongue being provided with the usual hand piece 54 for convenience in operation.

My novel lawn mower is operated in the usual manner, but with better results. As the front cutter is wider than the track of the wheels, no grass is crushed down by the wheels before cutting. The rear cutters extend the cut appreciably on each side and as they extend outward beyond the driving wheels and also beyond the driving mechanism for the front cutter, they enable either rear cutter to be run along close to a wall or close to the edge of a bank leaving the outer driving wheel at a safe distance from the edge of the bank. The rear cutters may also be run under overhanging bushes and will make a clean cut where it is practically impossible to cut with an ordinary lawn mower, thus doing away with a large amount of the hand trimming, that has heretofore been necessary. It should be noted furthermore, that each cutter is carried by an independent frame which swings on a center concentric with the pinion, or pinions, by which the cutter is driven, so that when the ground roller corresponding with either cutter passes over a little hummock or drops into a depression, the rising or falling movement of the cutter carried by that frame will be wholly independent of the other frames and their cutters. This gives great flexibility to the machine and enables the operator to make a relatively smooth and even cut even though the ground may be quite uneven.

Having thus described my invention, I claim:—

1. In a lawn mower, the combination of a shaft, side plates rigidly secured thereto, driving wheels which rotate on the peripheries of the side plates and are provided with internal gear teeth, pinions between the side plates which mesh with the gear teeth, shafts journaled in the side plates to which said pinions are fixed, a frame pivoted to swing on said shafts, a rotary cutter journaled in said frame, and driving connections intermediate the pinions and the cutter.

2. In a lawn mower, the combination of a shaft, side plates rigidly secured thereto and having inturned flanges, driving wheels having flanges outside thereof, ball bearings in said flanges on which the driving wheels rotate, said driving wheels being provided with internal gear teeth, pinions which mesh with the gear teeth, shafts journaled in the side plates, to which the pinions are fixed, a frame pivoted to swing on said shafts, cutting mechanism carried by the frame, and cutter driving mechanism actuated by the pinions.

3. In a lawn mower, the combination of a shaft, side plates rigidly secured thereto, driving wheels which rotate on the peripheries of the side plates, shafts journaled in the side plates, a frame pivoted to swing on said shafts, cutting mechanism carried by the frame, and driving connections intermediate the cutting mechanism and the driving wheels.

4. In a lawn mower, the combination of a shaft, side plates rigidly secured thereto, driving wheels which rotate on the peripheries of the side plates, shafts journaled in the side plates, a frame pivoted to swing on said shafts, a rotary cutter, bed knife and ground roller carried by the frame, and cutter driving connections actuated from the driving wheels.

5. In a lawn mower, the combination of a shaft, side plates rigidly secured thereto, driving wheels which rotate on the peripheries of the side plates, shafts journaled in the side plates, a frame pivoted to swing on said shafts, cutting mechanism and a ground roller carried by the frame, means for adjusting the ground roller to regulate the cut, and driving connections intermediate the cutting mechanism and the driving wheels.

6. In a lawn mower, the combination of a shaft, side plates rigidly secured thereto, driving wheels which rotate on the peripheries of the side plates and are provided with internal gear teeth, pinions between the side plates which mesh with the gear teeth, shafts journaled in the side plates to which said pinions are fixed, bevel gears on said shafts, a frame pivoted to swing on said shafts, a rotary cutter having a shaft journaled in said frame and carrying bevel gears, and other shafts having bevel gears meshing with the bevel gears on the pinion and cutter shafts.

7. In a lawn mower, the combination of a shaft, side plates rigidly secured thereto, driving wheels which rotate on the peripheries of the side plates, shafts journaled in the side plates, a front and two rear frames pivoted to swing on said shafts, cutters journaled in said frames, and cutter driving connections intermediate the cutters and the driving wheels.

8. In a lawn mower, the combination of a shaft, side plates rigidly secured thereto, driving wheels which rotate on the peripheries of the side plates, shafts journaled in the side plates, a front and two rear frames pivoted to swing on said shafts, a cutter journaled in the front frame and wider than the driving wheel track, cutters carried by the rear frames and extending outward from the driving wheels, and cutter driving connections intermediate the cutters and the driving wheels.

9. In a lawn mower, the combination of driving wheels, a front swinging frame and two rear swinging frames, a cutter carried by the front frame and wider than the driving wheel track, cutters carried by the rear frames and extending outward from the driving wheels, and cutter driving connections intermediate the cutters and the driving wheels.

10. In a lawn mower, the combination of a shaft, side plates rigidly secured thereto, driving wheels which rotate on the peripheries of the side plates, a front swinging frame and two rear swinging frames, a cutter carried by the front frame and wider than the driving wheel track, cutters carried by the rear frames and extending outward from the driving wheels, cutter driving connections intermediate the cutters and the driving wheels, and a tongue having curved arms secured to the shaft and to the side plates.

11. In a lawn mower, the combination of a shaft, side plates rigidly secured thereto, driving wheels which rotate on the peripheries of the side plates and are provided with internal gear teeth, pinions meshing with the gear teeth, shafts journaled in the side plates to which the pinions are fixed, a front and two rear frames pivoted to swing on said shafts, a cutter carried by the front frame and wider than the driving wheel track, cutters carried by the rear frames and extending outward from the driving wheels, and cutter driving connections intermediate the cutters and the driving wheels.

12. In a lawn mower, the combination of a shaft, side plates rigidly secured thereto and having inturned flanges, driving wheels having flanges outside thereof, and internal gear teeth, ball bearings in said flanges on which the driving wheels rotate, pinions meshing with the gear teeth, shafts journaled in the side plates to which the pinions are fixed, a front and two rear frames pivoted to swing on said shafts, a cutter carried by the front frame and wider than the driving wheel track, cutters carried by the rear frames and extending outward from the driving wheels, and cutter driving connections intermediate the cutters and the driving wheels.

In testimony whereof I affix my signature.

JOHN S. GILBERTIE.